(12) United States Patent
Bascin

(10) Patent No.: US 11,769,658 B2
(45) Date of Patent: Sep. 26, 2023

(54) LAMP WITH TEMPERATURE CONTROL

(71) Applicant: Trojan Technologies Group ULC, London (CA)

(72) Inventor: David Earl Bascin, London (CA)

(73) Assignee: Trojan Technologies Group ULC, London (CA)

( * ) Notice: Subject to any disclaimer, the term of this patent is extended or adjusted under 35 U.S.C. 154(b) by 37 days.

(21) Appl. No.: 17/351,879

(22) Filed: Jun. 18, 2021

(65) Prior Publication Data

US 2022/0037143 A1 Feb. 3, 2022

Related U.S. Application Data

(60) Provisional application No. 63/057,573, filed on Jul. 28, 2020.

(51) Int. Cl.
| | | |
|---|---|---|
| *H01J 61/52* | (2006.01) | |
| *H01K 1/62* | (2006.01) | |
| *H01K 1/54* | (2006.01) | |
| *H01K 1/58* | (2006.01) | |

(52) U.S. Cl.
CPC ............... *H01K 1/62* (2013.01); *H01K 1/54* (2013.01); *H01K 1/58* (2013.01)

(58) Field of Classification Search
CPC ........ H01K 1/62; H10K 59/30; H10K 50/865; H10K 50/86; H10K 50/85; H10K 59/35; H10K 59/122; H10K 59/353; H01J 61/52; H01J 61/28; H01J 61/70
See application file for complete search history.

(56) References Cited

U.S. PATENT DOCUMENTS

| | | | |
|---|---|---|---|
| 5,808,418 A * | 9/1998 | Pitman | H01J 61/52 315/117 |
| 6,874,914 B2 | 4/2005 | Desanto et al. | |
| 8,338,808 B2 * | 12/2012 | Fraser | H01J 61/20 250/435 |
| 2004/0232846 A1 | 11/2004 | Fischer et al. | |
| 2006/0267495 A1 * | 11/2006 | Pirovic | H01J 61/28 313/547 |
| 2009/0026965 A1 * | 1/2009 | Van Den Broek | H01J 61/28 315/115 |

FOREIGN PATENT DOCUMENTS

WO    WO2020148597 A1    7/2020

OTHER PUBLICATIONS

China National Intellectual Property Administration, "The First Office Action", dated Apr. 1, 2022, 17 pages.

* cited by examiner

*Primary Examiner* — Donald Raleigh
(74) *Attorney, Agent, or Firm* — Ference & Associates LLC

(57) ABSTRACT

An embodiment provides a lamp apparatus, including: at least one filament; an amount of amalgam; a heat-sink assembly connected to the lamp apparatus; and at least one control circuit comprising a heating element and a temperature measurement element connected to the at least one filament, wherein the control circuit varies the electrical power delivered to the heating element, thereby controlling an internal temperature of the lamp apparatus relative to a temperature set point. Other aspects are described and claimed.

18 Claims, 10 Drawing Sheets

LAMP WITH TEMPERATURE CONTROL

CROSS REFERENCE TO RELATED APPLICATION

This application claims priority to U.S. Provisional Patent Application Ser. No. 63/057,573, filed on Jul. 28, 2020, and entitled "LAMP WITH TEMPERATURE CONTROL," the contents of which are incorporated by reference herein.

FIELD

This application relates generally to water quality treatment, and, more particularly, to controlling an ultraviolet light for the treatment of an aqueous fluid.

BACKGROUND

The proper disinfection of water is critical to ensure water quality. As the need for cleaner sources of water has increased, water disinfection methods had evolved to match the rising challenge. Water supplies may contain heavy metals, sediment, chemicals, pesticides, or the like. Water sources may also contain pathogens such as microorganisms, viruses, or the like. Left untreated, such water may be unhealthy or unsafe for use by humans or animals. Ultraviolet (UV) light treatment of water may be used to inactivate pathogens. Water may pass through a small chamber or a larger vessel where the water is subjected to UV light. The UV treatment may damage nucleic acids of the pathogens. The disruption of the genetic material may render the pathogens incapable of performing vital cellular functions, thereby rendering them harmless. Thus, this UV process may make water potable despite the water source containing microorganisms, viruses, or the like.

BRIEF SUMMARY

In summary, one embodiment provides a lamp apparatus, comprising: at least one filament; an amount of amalgam; a heat-sink assembly connected to the lamp apparatus; and at least one control circuit comprising a heating element and a temperature measurement element connected to the at least one filament, wherein the control circuit varies the electrical power delivered to the heating element, thereby controlling an internal temperature of the lamp apparatus relative to a temperature set point.

Another embodiment provides a method for controlling an internal temperature of a lamp: measuring a temperature of the lamp apparatus, wherein the lamp comprises at least one filament, an amount of amalgam, a heat-sink connected to the lamp, and at least one control circuit comprising a heating element and a temperature sensing element connected to the at least one filament; comparing the measured temperature of the lamp to a temperature set-point; and controlling, using the at least one control circuit the measured temperature of the lamp based upon the comparing.

A further embodiment provides a product for controlling a lamp, comprising: a storage device that stores code, the code being executable by a processor and comprising: code that measures the internal temperature of the lamp, wherein the lamp comprises at least one filament comprising an amount of amalgam, a heat-sink connected to the at least one filament, and at least one control circuit comprising a temperature sensing element and a heating element, connected to the at least one filament; code that compares the measured temperature of the lamp to a temperature set-point; and code that controls, using at least one of: the heat-sink and the at least one control circuit, the internal temperature of the lamp based upon the comparing.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
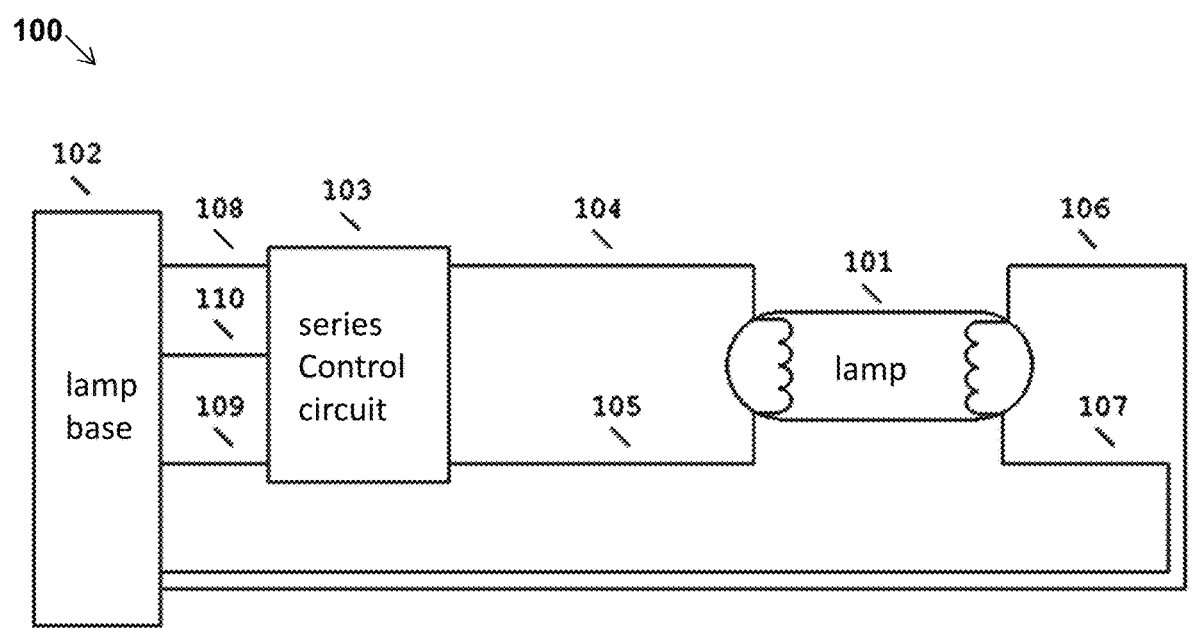
FIG. 1 illustrates an example embodiment of a lamp control circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

The performance of a lamp, including ultraviolet (UV) lamps, may be reduced in temperature ranges outside of an optimal performance range. The temperature of the lamp fixture and/or ambient temperature may affect light output of the lamp. This may in part be due to vapor pressure within the lamp which depends on the fixture and/or ambient temperature. Some lamps may use an amalgam. The amalgam may extend the temperature range in which a lamp provides a proper light output. The amalgam may modify or extend the temperature range over which a lamp provides a proper light output. The amalgam may change the relationship between the vapor pressure within the lamp and the temperature of the lamp.

Conventional lamps may use a passive system to control amalgam temperature. The passive systems may rely on a predicted lamp performance over the range of conditions. The conditions may include the lamp environment or ambient temperature, dimming, or the like. Passive systems may compensate temperature at a fixed rate or an open-loop rate. Active systems may require an additional source of power. The additional source of power may heat the amalgam. These additional sources of power may add to the cost, maintenance, complexity, or the like of the lamp.

Conventional methods and systems for controlling amalgam temperature may restrict the maximum power output for a lamp. More precise control of the amalgam temperature would result in higher performance of lamp power output. Passive systems are constrained by combined tolerances on the lamp components such as the composition and quantity of amalgam, the composition and pressure of gas, the filament dimensions, and the thermal coupling to the environment.

The power of the lamp may be limited due to a limited range of useful amalgam material temperature. Should the power be too high for the passive or open loop approach, the amalgam temperature may become too high and the lamp efficiency drops or in extreme cases the lamp output drops significantly due to excessive mercury vapor pressure. The closed loop control of temperature reduces these issues by maintaining a more precise control of amalgam temperature across the range of tolerances and environmental conditions. What is needed is a system and method to precisely control amalgam temperature using an adaptive means with lower cost and complexity.

Accordingly, an embodiment provides an apparatus and method for the control of temperature of a lamp. In particular, a lamp and associated filament, amalgam, associated components, vapor within the lamp, and the like may be temperature controlled to optimize lamp light output and performance. In an embodiment, a lamp apparatus may have at least one filament. There may be an amount of amalgam. The amalgam may be located on or near a filament within the lamp. The lamp apparatus may have a heat-sink assembly. The lamp apparatus may have one or more temperature control circuits. The lamp may have a temperature sensing element. The temperature control circuit may introduce a heating load to one or more filaments. The combination of a heat-sink and heating power may control the temperature of amalgam as measured by the temperature sensing element. The temperature of the lamp may be maintained at a set-point, above or below a threshold, maintained in a range, or the like. The temperature control circuit may be in a parallel, series or both series and parallel electrical configuration to each of the filaments in a lamp. In an embodiment, control of the lamp temperature requires no further connections for temperature control. In an embodiment, there may be a data connection from the lamp to a control or power source outside the lamp.

In summary, one embodiment provides a lamp apparatus, comprising: a lamp having at least one location for amalgam, an amount of amalgam; a heat-sink assembly thermally connected to the lamp near the at least one location for amalgam with a temperature sensor and a heating load thermally coupled to the heat-sink; and at least one temperature control circuit connected to the at least one filament, wherein the temperature control circuit introduces a heating load by drawing power from the lamp power supply via the connection to the at least one filament so that the heating load heats the at least one location for amalgam, thereby controlling an internal temperature of the lamp apparatus and the at least one location for amalgam, and the amalgam, in view of a temperature set point.

Another embodiment provides a method for controlling an internal temperature of a lamp: measuring a temperature related to the internal temperature of the lamp, wherein the lamp comprises at least one location for amalgam, an amount of amalgam, a heat-sink thermally connected to the at least one location for amalgam, and at least one temperature control circuit connected to the at least one filament; comparing the temperature related to the internal temperature of the lamp to a temperature set-point; and controlling, using at least one of: the heat-sink and the at least one temperature control circuit, the internal temperature of the lamp based upon the comparing.

A further embodiment provides a product for controlling a lamp, comprising: a storage device that stores code, the code being executable by a processor and comprising: code that measures the temperature related to the internal temperature of the lamp, wherein the lamp comprises a lamp having at least one location for amalgam, an amount of amalgam, a heat-sink assembly thermally connected to the lamp near the at least one location for amalgam with a temperature sensor and a heating load thermally coupled to the heat sink, and at least one temperature control circuit connected to the at least one filament; code that compares the internal temperature of the lamp as determined from the temperature sensor to a temperature set-point; and code that controls, using the at least one temperature control circuit, the internal temperature of the lamp based upon the comparing.

A further embodiment provides a product for controlling a lamp, comprising: a storage device that stores code, the code being executable by a processor and comprising: code that uses a measured radiation intensity related to the radiation output of the lamp, wherein the lamp comprises a lamp having at least one location for amalgam, an amount of amalgam, a heat-sink assembly thermally connected to the lamp near the at least one location for amalgam with a temperature sensor and a heating load thermally coupled to the heat sink, and at least one temperature control circuit connected to the at least one filament; at least one radiation sensor exposed to the output of the lamp; code that compares the at least one radiation sensor output to a radiation set-point and uses that comparison to determine a temperature set-point; code that compares the internal temperature of the lamp as determined from the temperature sensor to the determined temperature set-point; and code that controls, using the at least one temperature control circuit, the internal temperature of the lamp based upon the comparing thus controlling the radiation output and the internal temperature of the lamp.

A further embodiment provides a product for controlling a lamp, comprising: lamp power supply with at least one connection for communication with a control circuit, a storage device that stores code, the code being executable by a processor and comprising: code that uses a measured radiation intensity related to the radiation output of the lamp, wherein the lamp comprises a lamp having at least one location for amalgam, an amount of amalgam, a heat-sink assembly thermally connected to the lamp near the at least one location for amalgam with a temperature sensor and a heating load thermally coupled to the heat sink, and at least one temperature control circuit connected to the at least one filament and also connected to the at least one connection for communication with a lamp power supply; at least one radiation sensor exposed to the output of the lamp; code that compares the at least one radiation sensor output to a radiation set-point and uses that comparison to determine both a temperature set-point and determine a combination of one or more of lamp filament current and voltage set-point, lamp arc current or power set-point; code that sends the filament current and voltage, arc current or power set-point or set-points to the lamp power supply; code that compares the internal temperature of the lamp as determined from the temperature sensor to the determined temperature set-point; and code that controls, using the at least one temperature control circuit, the internal temperature of the lamp based upon the comparing thus controlling the radiation output and the internal temperature of the lamp.

The illustrated example embodiments will be best understood by reference to the figures. The following description is intended only by way of example, and simply illustrates certain example embodiments.

Figure 2:
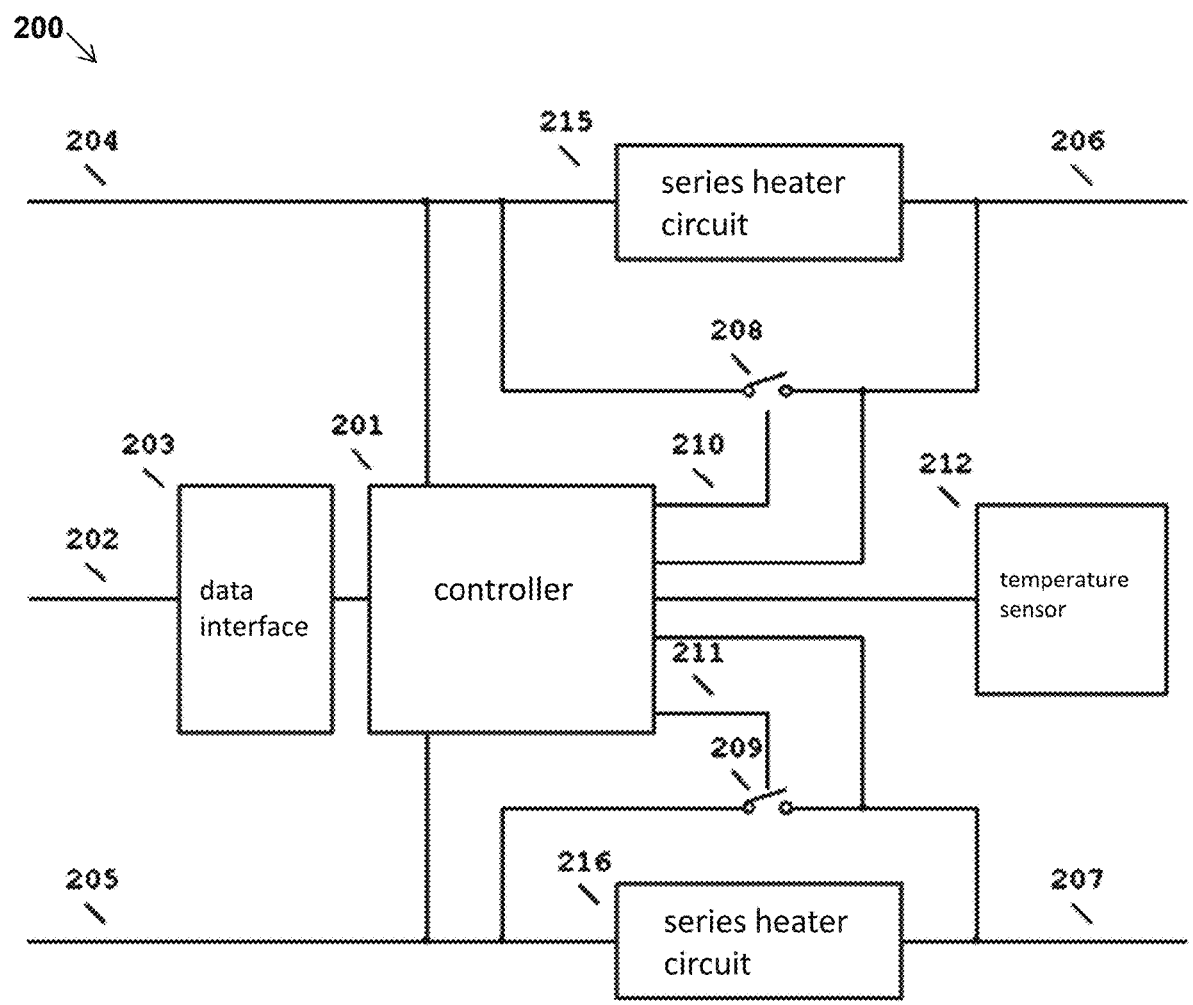
FIG. 2 illustrates another example embodiment of a lamp control circuitry.

Referring to FIG. 1, an embodiment may contain an amalgam heater circuit. The amalgam heater circuit may be placed electrically in series with at least one lamp filament connection. The lamp base with contacts 102 may be a point of connection to the lamp power supply in the conventional manner. In an embodiment, there may be an additional connection using a data wire 110. The lamp base with contacts 102 may have five contacts bringing out the connections from data wire 110. These contacts may include: a filament connection 108, a second filament connection 109, a filament wire 106 and a second filament wire 107. The filament wire 106 and second filament wire 107 may run unimpeded from the lamp 101 to the lamp base with contacts 102. An example embodiment is illustrated and described, other embodiments are disclosed. In an embodiment, the series control circuit 103 may be connected to the lamp 101 in series with the lamp filament wires, that is filament wire 104 and second filament wire 105, providing the filament connection 108 and second filament connection 109 to the lamp base with contacts 102. In an embodiment, the series control circuit 103 contains circuitry to control the heating of the amalgam as illustrated in FIG. 2. An example embodiment is illustrated and described, other embodiments are disclosed.

Referring to FIG. 2, in an embodiment, controller 201 may be connected to a data interface 203. The data interface may have a data connection 202. The data interface may have at least one conductor used with or without either filament connection 204 or second filament connection 205. The data connection 202 may be used to transmit or receive data to external devices, for example, a connected lamp power supply.

In an embodiment, the controller 201 may be connected to at least one temperature sensor 212. The temperature sensor may measure any or all of the lamp body temperature, and may measure at or near the amalgam location, the environment temperature near the lamp etc. In an embodiment, there may be multiple temperature sensors.

In an embodiment, the controller 201 may have two outputs, 210 and 211. The outputs 210 and 211 may turn on or turn off a power switch 208 and power switch 209 respectively which switches when on bypass the series heater circuit 215 and series heater circuit 216 respectively. The controller 201 in operation may use an internally stored pre-programmed temperature set point, range, threshold, or the like. The pre-programmed temperature set point may establish a target temperature and/or control the duty cycle of the power switch 208 and power switch 209 to maintain the temperature set point, range, threshold, or the like.

In an embodiment, the power switch 208 and power switch 209 may have the following characteristics. The power switch 208 and power switch 209 may be two N-channel enhancement mode power MOSFET devices that may be connected in series to form an AC switch. The control of the power switch 208 and power switch 209 from the output of the controller 201 may use isolated photovoltaic gate drivers or other method.

In an embodiment, the system may have one or more series heater circuits. In an embodiment, the series heater circuit 215 and series heater circuit 216 may work together to dissipate electrical power as heat. The one or more series heater circuit may be thermally coupled to the amalgam location on the lamp. The series heater circuit 215 and the series heater circuit 216 may dissipate power due to arc current or filament current during lamp operation. In the case the controller 201 is not powered, the power switch 208 and power switch 209 may be designed to be normally open, then there may be a degree of heating provided even though the controller 201 is not powered.

The controller 201 may be connected to both filament connection 204 and second filament connection 205 and to filament wire 206 and filament wire 207. The one or more filament wires 206 and 207 connect to the lamp filament and through those connections the controller 201 may obtain a power supply voltage either or both from the series voltage drops of the series heater circuit 215 and or series heater circuit 216 and the voltage across the filament connection 204 and second filament connection 205. Alternatively, the data connection 202 may provide power for the controller 201.

In an embodiment, power supplies such as series linear or boost and buck switching power conversion circuits may be used within controller 201 to power the circuits. The controller 201 which logic may operate with low voltage direct current, and may be powered by lower or higher direct or alternating current voltages in the lamp circuits.

In an embodiment, the controller 201 may be a microcontroller unit (MCU) which may incorporate a processor core, program memory, at least one serial communications port and digital output to control the power switch 208 and power switch 209. The MCU device may include nonvolatile memory storage such as electrically erasable programmable read only memory (EEPROM). This EEPROM memory may hold data including the temperature set point, historical temperatures, location, time, lamp cycles, lamp power, and other operating data as may suit the specific control program stored in the MCU. The controller 201 may be a conventional analog controller such as a comparator, sawtooth generator, and reference to produce an analog PWM output to control the power switch 208 and power switch 209.

In an embodiment, when the current in both filament connection 204 and second filament connection 205 are flowing in the same direction such as into or out of the lamp arc, the controller 201 can obtain power from the voltage drop across series heater circuit 215 and/or series heater circuit 216. In an embodiment, the controller 201 obtains the power for control from the lamp arc current.

In an embodiment, the controller 201 may report the state of the heater over time to the lamp power supply using the data connection 202. In an embodiment, lamp power supply may increase the lamp arc output to compensate for the power in the heater. In an embodiment wherein there is no data connection 202 the lamp power supply could measure the state of the heater by observing the modulation of the lamp arc voltage and therefore be able to determine the heater power and compensate accordingly without communication with the controller 201.

In an embodiment, when the current in both filament connection 204 and second filament connection 205 are flowing in the opposite direction such as net current into or out of filament connection 204 or second filament connection 205, the controller 201 may obtain power from the voltage between filament connection 204 and second filament connection 205. Thus the controller 201 may obtain the power for control from the lamp filament current.

Figure 3:
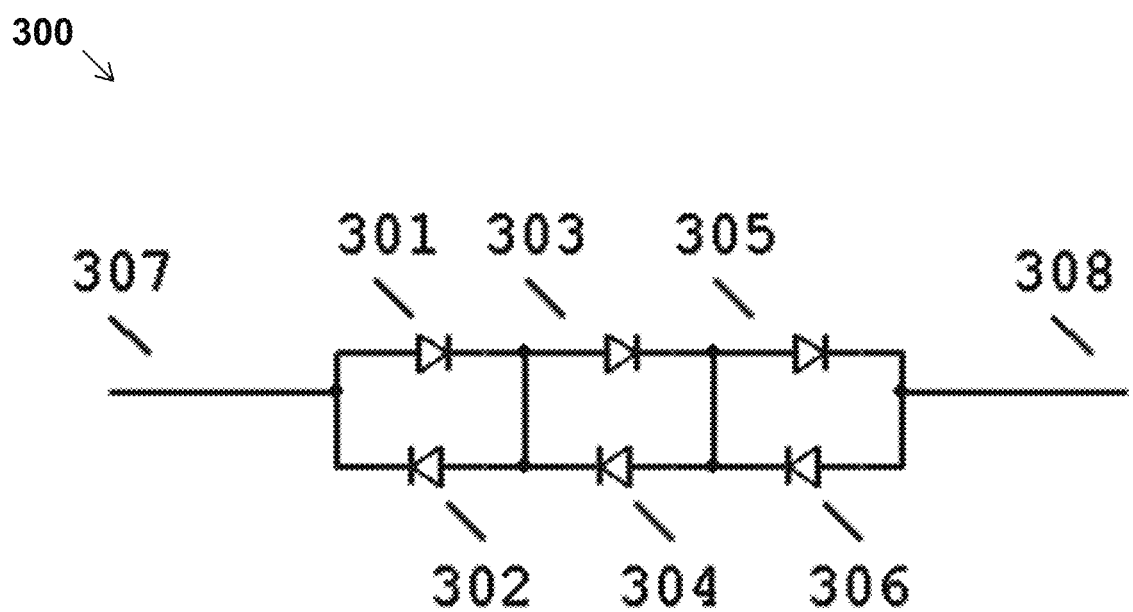
FIG. 3 illustrates another example embodiment of heating circuitry.

Referring to FIG. 3, in an embodiment, one segment of the heater comprising the diode 301 and diode 302 may both allow alternating current to flow bidirectionally. Additionally or alternatively, the diodes may dissipate power due to the diode forward voltage drop. This circuit may be placed in series with the lamp filament via connection 307 and connection 308. Additional diodes (303, 304, 305, and 306) may be similarly used to increase the voltage drop, for example, to dissipate more power for a given current. An alternative to using junction diodes may be to use Zener or avalanche diodes which results in asymmetric power dissipation depending on the ratio of Zener voltage to forward voltage. For example, the number of segments may be integral multiples of two such that the power is symmetric in the overall heating circuit. For example, the junction diodes as the power dissipating element may allow a forward voltage drop to limit the power dissipated and to self-regulate the temperature of the diodes in the event of a failure of the circuit controlling the heater since the diode forward voltage has a negative temperature coefficient. As another example, the junction diodes as power dissipating element may allow that with sufficient heater segments in series the voltage across the heater may be large enough to be used to provide a power supply to the control circuit including over a range of heater current whereas a simple resistive heater would not at lower currents provide sufficient voltage for a power supply.

Figure 7:
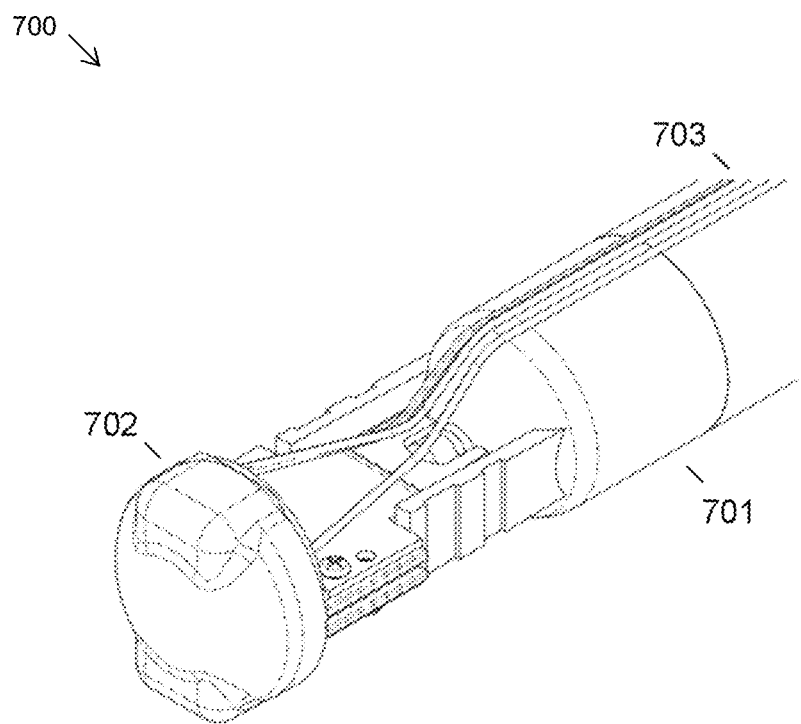
FIG. 7 illustrates a schematic of an example embodiment of a lamp assembly.

Referring to FIG. 7, in an embodiment the lamp 701 may comprise a heating assembly 702 from which the filament wires 703 emerge. The heating assembly 702 is representative example of that described for FIG. 1. The heating assembly 702 may be designed to provide cooling of the end of the lamp 701. The cooling may be sufficient that for optimal amalgam temperature operation there is required to be some heating applied by the heating assembly 702. The application of such cooling could be adapted to different lamps or operating temperature ranges while retaining the same basic operating principles. Cooling to some degree below optimum may allow for the control of amalgam temperature towards an optimum by the application of heat over a desired operating temperature range that the lamp assembly may already operate within, such as inside a sleeve for water treatment applications.

Figure 8:
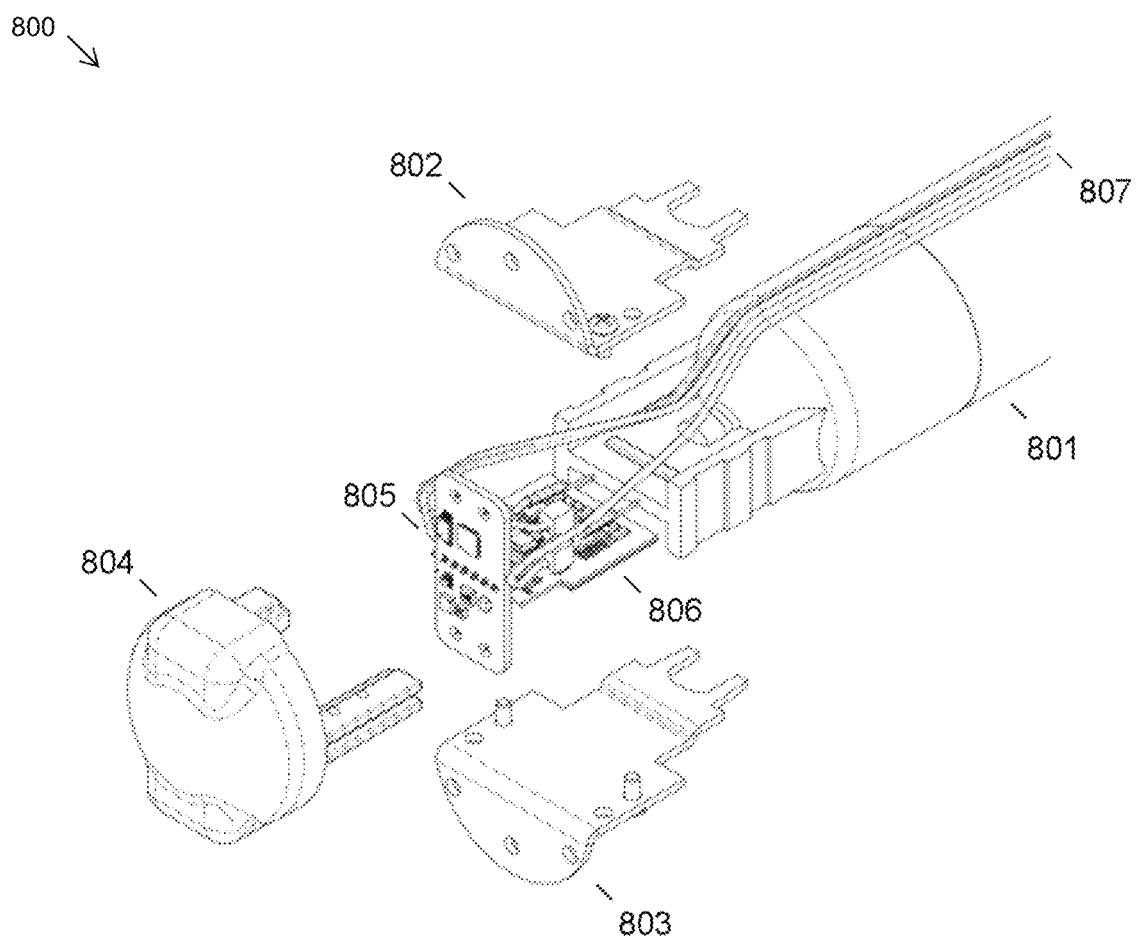
FIG. 8 illustrates a schematic of an example embodiment of a lamp assembly.

Referring to FIG. 8, an exploded view of an embodiment as illustrated in FIG. 7 is shown. In an embodiment the lamp 801 may have a heater circuit board 806 and control circuit board 805 held to the lamp using screws, or the like, on the base 803, lid 802 and cap 804. In an embodiment, a thermal conductive material may be used between the lid 802 and the lamp 801. Additionally, a thermal conductive material may be used between the base 803 and the lamp 801. In an embodiment, the thermal conductive material may be affixed with an adhesive, cement, thermally conductive compressible pad, or the like. In an embodiment, the controller 805 may be attached to the heater 806 with a temperature sensor located on the heater 806. The heater 806 may be thermally coupled and mounted to the base 803. In an embodiment, a thermally conductive material such as an adhesive, paste, thermally conductive compressible pad, or the like may be used between the heater 806 and the base 803. In an embodiment, locating the temperature sensor on the heater 806 nearest as practical to the amalgam location on the lamp surface may be preferred.

Figure 4:
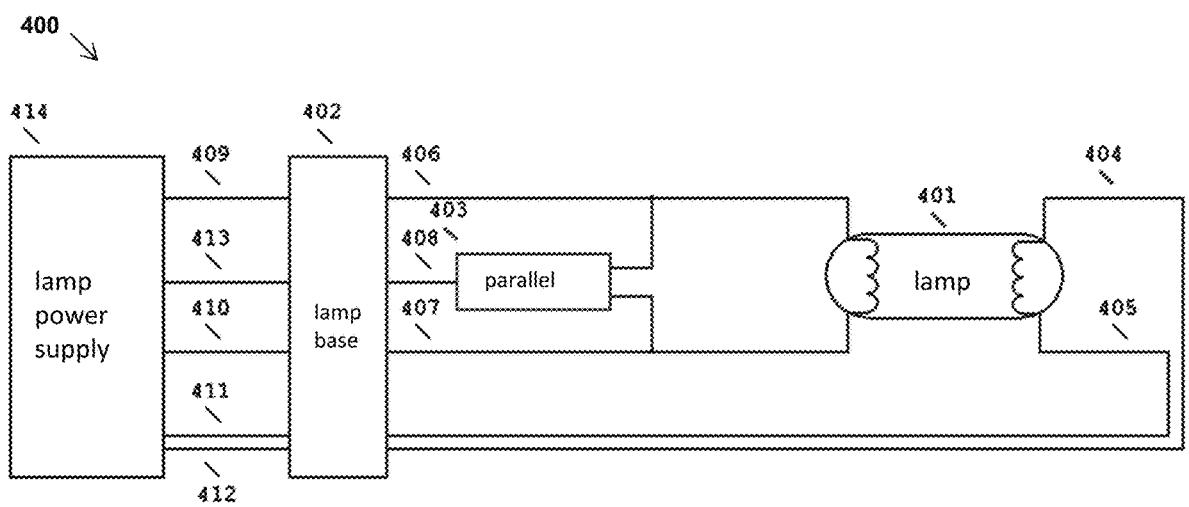
FIG. 4 illustrates another example embodiment of a lamp control circuitry.

Referring to FIG. 4, in an embodiment an amalgam heater circuit may be placed electrically in parallel with at least one lamp filament connection. In an embodiment, the amalgam heater circuit may work in conjunction with circuits in the lamp power supply 414 that may control the filament voltage and current to maintain the required filament heating power and amalgam heating power.

In an embodiment, the lamp power supply 414 may be connected to the lamp base 402 via filament conductors (409, 410, 411, and 412) and data line 413. These correspond to filament wire 406, filament wire 407, filament wire 405, and filament wire 404 respectively within the lamp assembly itself.

In an embodiment, the parallel control circuit 403 may communicate with the lamp power supply 414 over data line 408 and data line 413 to indicate the required operating current for amalgam heating. The lamp power supply 414 may set the output current limit of the filament output on 409-410 as requested and sets the filament output voltage to a value resulting in the required filament heating. At the time the parallel control circuit 403 has the heater connected across the filament wires 406 and 407 the lamp power supply 414 filament output on filament connection (409 to 410) may operate in constant current mode, since the impedance of the circuit is now approximately 10 times lower than that of the filament alone.

In an embodiment, the parallel control circuit 403 may turn the connection of the amalgam heater on and off across the filament wires 406 and 407; when the amalgam heater is turned off the lamp power supply 414 filament output on filament connection (409 to 410) operates in constant voltage mode, since the impedance of the circuit is now the hot or cold filament resistance which is much larger than the heater resistance. The lamp power supply 414 may measure the filament current and voltage to determine the delivered filament power, and such measurement of filament voltage may be provided or augmented by measured filament voltage data sent from the parallel control circuit 403.

In an embodiment, amalgam temperature may be controlled by the parallel control circuit 403, and control of the filament heating may be achieved by the lamp power supply 414 except that of the total output on the filament connection (409 to 410) includes both filament power and amalgam heating power.

In an embodiment, the lamp base with contacts 402 may be the point of connection to the lamp power supply with or without the optional connection from data wire 408. The lamp base with contacts 402 may have five contacts bringing out the connections from data wire 408, filament connection 406, filament connection 407, filament wire 404 and filament wire 405. The filament wires (404, 405, 406, and 407) may run unimpeded from the lamp 401 to the lamp base with contacts 402.

In an embodiment, the control circuit 403 may be connected to the lamp 401 in parallel with the lamp filament wires, 406 and 407. The parallel control circuit 403 may contain circuitry to control the heating of the amalgam (see FIG. 5).

Figure 5:
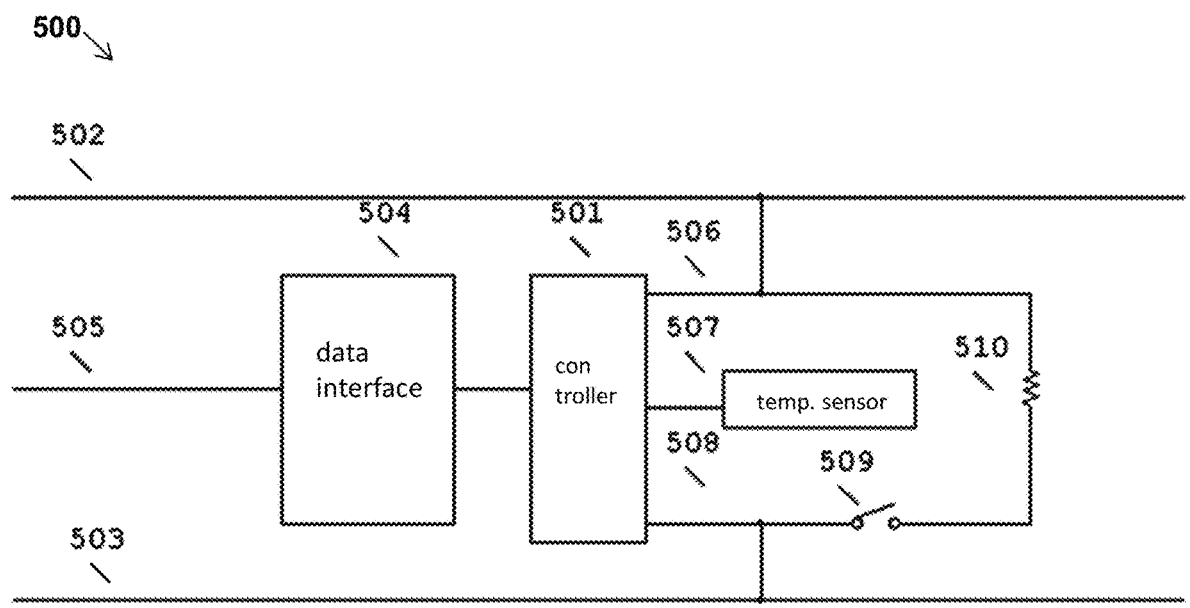
FIG. 5 illustrates another example embodiment of a lamp control circuitry.

Referring to FIG. 5, in an embodiment the controller 501 may connected to the data interface 504 which has a data connection 505. The data connection may be at least one conductor used with or without one or more of filament input 502 or filament input 503. The data connection 505 may be used to transmit or receive data to external devices including a connected lamp power supply.

In an embodiment, the controller 501 may be connected to at least one temperature sensor 507 which measures any or all of the lamp body temperature at or near the amalgam location, the environment temperature near the lamp, or the like. The controller 501 may have an output to turn on or turn off power switch 509 which when on connects the parallel heater resistance 510 across the filament input 502 and filament input 501. The controller 501 may use an internally stored pre-programmed temperature set point, threshold, range, or the like to establish a target temperature and control the duty cycle of the power switch 509 to maintain the temperature set point, threshold, range, or the like.

In an embodiment, the power switch 509 may be two N-channel enhancement mode power MOSFET devices connected in series to form an AC switch. In an embodiment, control of the gate circuits to implement power switch 509 from the output of the controller 501, may use isolated photovoltaic gate drivers or other method. Alternate methods than the example N-channel enhancement mode power MOSFET devices to control the heater on and off from the controller 501 are disclosed and contemplated.

In an embodiment, the parallel heater may dissipate electrical power as heat thermally coupled to the amalgam location on the lamp. The heater resistance 510 may be disconnected by the power switch 509 in case the controller 501 is not itself powered.

In an embodiment, the controller 501 being connected to filament input 502 and filament input 503 may allow power for the controller 501 circuits from the filament voltage. Alternatively, the data connection 505 may also provide power for the controller 501. In an embodiment, power supply techniques such as series linear or boost and buck switching power conversion circuits may be used within controller 501 to power its circuits, thus the controller 501 which logic may operate off low voltage direct current may be powered by lower or higher direct or alternating current voltages in the lamp circuits.

In an embodiment, the controller 501 may be a microcontroller unit (MCU) which incorporates a processor core, program memory, at least one serial communications port and digital output to control the power switch 509. The MCU device may include nonvolatile memory storage such as electrically erasable programmable read only memory (EEPROM). This EEPROM memory may hold data including the temperature set point, historical temperatures, location, time, lamp cycles, lamp power, and other operating data as may suit the specific control program stored in the MCU.

In an embodiment, the controller 501 may be a conventional analog controller such as a comparator, sawtooth generator and reference to produce an analog PWM output to control the power switch 509, in which case the lamp power supply of FIG. 4 may measure the filament current and voltage as seen at the power supply terminals at such timing intervals as to sample the voltage and current both when the heater is on and when the heater is off and by doing so be able to control the filament and heater power via the same combination of constant current and constant voltage output as previously described.

Figure 6:
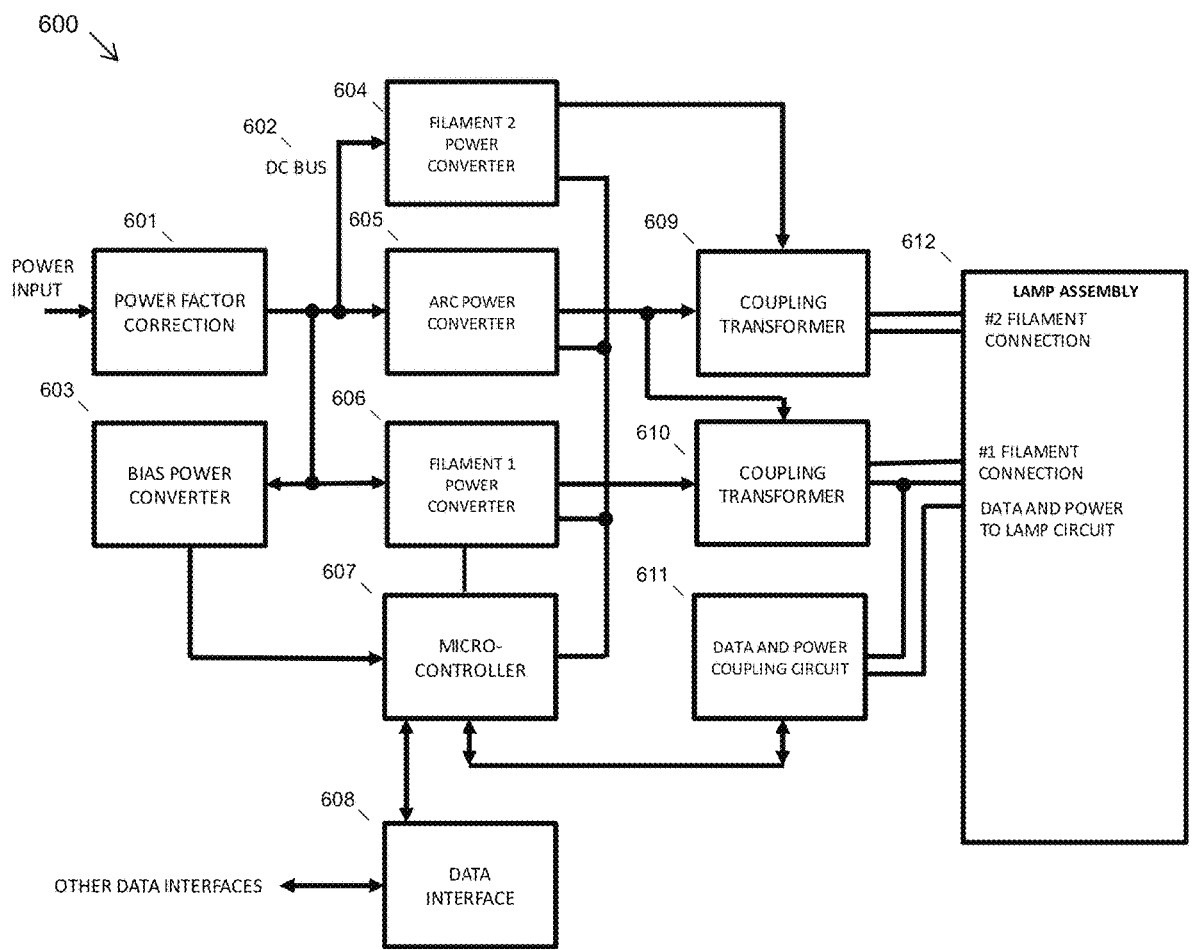
FIG. 6 illustrates a block diagram of an embodiment of a system to control a lamp assembly.

Referring to FIG. 6 a block diagram of an embodiment of the main elements of a lamp power supply (see FIG. 8) to be used with the lamp assembly integrating temperature control is illustrated. In an embodiment, power factor correction 601 may produce a DC BUS 602 which may power the other circuits in the lamp power supply. A bias power converter 603 takes the DC BUS 602 and provides the low voltages needed for digital and analog controls in the lamp power supply. The bias power converter 603 can be of the buck or flyback type. The micro controller 607 can be a single integrated circuit micro controller device or multiple devices, possessing serial communications peripherals such as UART or USART, analog to digital conversion for sensor inputs, stored program memory typically ROM or FLASH, random access memory (RAM) for program variables, pulse width modulation (PWM) outputs for power stage control. The micro controller 607 by itself or along with analog interface circuits, such as gate driver integrated circuits, can control the arc power converter 605, the filament 1 converter 608 and the filament 2 converter 604. The micro controller 607 can turn on or off, regulate any or all of voltage, current or power from the arc power converter 605, the filament 1 converter 608 and the filament 2 converter 604, whether purely through digital means or through a combination of analog power control circuits and the micro controller 607 signals.

In operation the arc power converter 605 output may be coupled with filament 1 power converter 606 output using coupling transformer 610 which transformer is designed to couple the arc power converter 605 output as a common-mode output on the filament output wires of the lamp power supply.

Similarly in operation the arc power converter 605 output may be coupled with filament 2 power converter 604 output using coupling transformer 609 which transformer is designed to couple the arc power converter 605 output as a common-mode output on the filament output wires of the lamp power supply.

In an embodiment, the lamp power supply (see FIG. 8) may have one or two independently controllable filament outputs represented by filament 1 power converter 606 and filament 2 power converter 604 and which filament outputs can be controlled by means of micro controller 607 to operate at selected constant current and constant voltage levels, with the levels programmable such that the constant voltage mode may be used for filament heating and automatically supply constant current when the parallel heater operation as in FIG. 4 has the heater turned on.

In an embodiment, the micro controller 607 can use the data and power coupling circuit 611 to form an interface to the lamp assembly with integrated temperature control as in FIG. 1 or in FIG. 4. The data and power coupling circuit 611 may provide a bidirectional data path and couple power at the same time. One method of coupling data and power being a voltage source with series impedance sized to provide sufficient current to operate the integrated temperature control as in FIG. 1 or in FIG. 4 and coupling the data onto the same power supply wire, using AC coupling methods (modulator demodulator) or DC coupling such as serial data transmission by pulling the power supply line down to near zero volts with respect to one filament connection at either end of the data path using transistors. Other methods of data communications wired or wireless may be used.

In an embodiment, the lamp power supply of FIG. 8 may be constructed with two such data and power coupling circuits, one for each lamp filament. The lamp power supply of FIG. 8 may be used to power more than one lamp and that such a multiple lamp power supply may or may not combine redundant circuits such as a single micro controller or single bias power converter where there are multiple lamps and the like.

Figure 9:
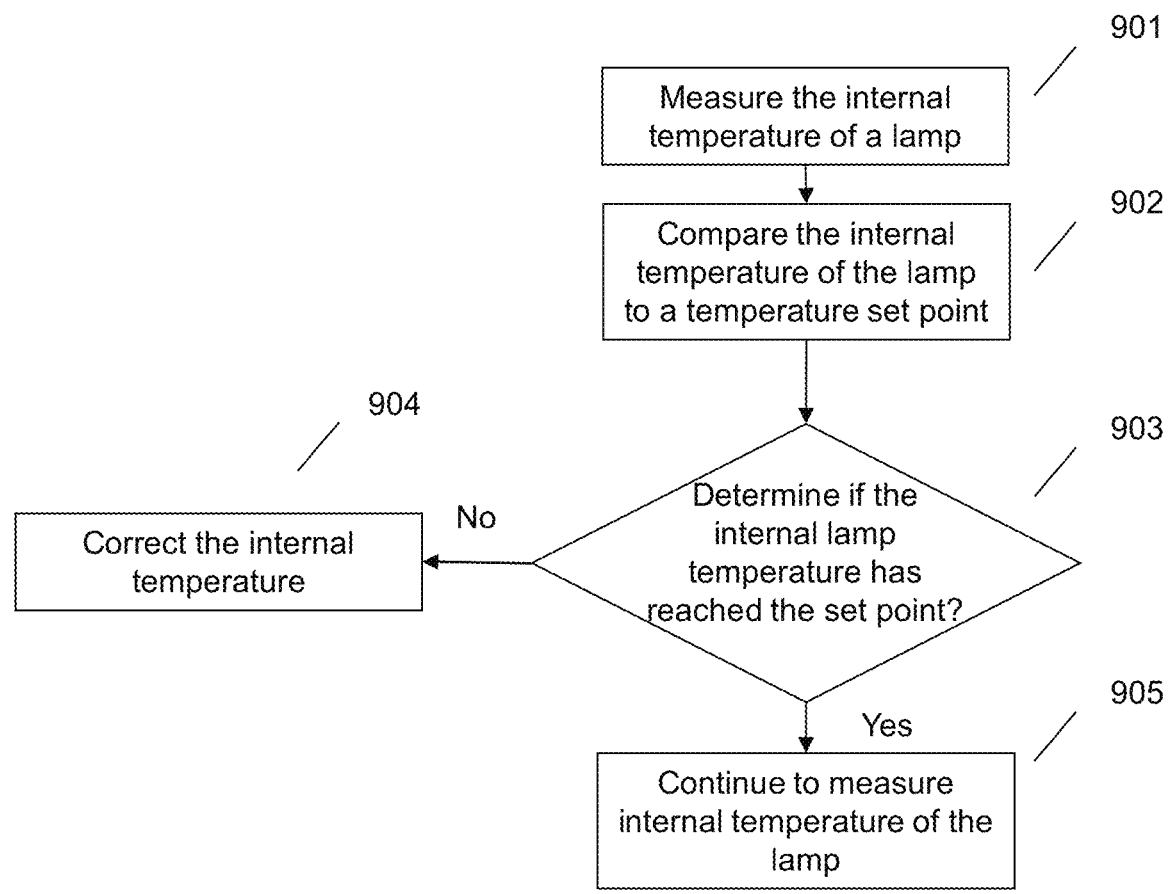
FIG. 9 illustrates a flow diagram of an example lamp temperature control system.

Referring to FIG. 9 illustrates a flow diagram of an example lamp temperature control system. Other embodiments and further detail are provided throughout. In an embodiment, the temperature of a lamp may be controlled. In an embodiment, a lamp apparatus may comprise at least one filament. An amount of amalgam may be located upon at least one of the filaments. The lamp apparatus may have a heat-sink and a control to provide a heat load to at least one filament and an amount of amalgam.

At 901, in an embodiment, the system may measure the internal temperature of a lamp (see FIG. 1) using a temperature sensor. An example embodiment of the sensor and associated controller is illustrated by FIG. 2 and within the corresponding specification.

At 902, in an embodiment, the system may compare the internal temperature of the lamp to a temperature set point. An example embodiment of the system controlling a lamp temperature to a set point is illustrated in FIG. 2 and FIG. 5, and within the corresponding specification.

At 903, in an embodiment, the system may determine if the internal lamp temperature has reached the temperature set point. In an embodiment, the internal lamp temperature from a temperature sensor is compared to a temperature set point. The system may attempt to maintain the internal lamp temperature at a set point. The set point may be determined based upon the optimization of light output for the lamp in conjunction with the environmental conditions of the lamp and the use of the lamp.

At 904, in an embodiment, if an internal temperature of the lamp has not reached the temperature set point, the system may take corrective action and/or continue to measure internal lamp temperature. For example, the system may continue to heat or cool the lamp until the set point is reached. In an embodiment, the system may use either the heat-sink or a heat load to cool or warm the lamp respectively. An embodiment of the heating is described in FIG. 2, FIG. 3, and FIG. 4, and within the corresponding specification. The heating and/or cooling may be adjusted using a controller as illustrated in FIG. 5 and FIG. 6, and within the corresponding specification Additionally or alternatively, the system may output an alarm, log an event, or the like.

At 905, in an embodiment, if the internal temperature of the lamp has reached the temperature set point, the system may continue to measure an internal lamp temperature. The system may connect to a communication network. The system may alert a user or a network. An alert may be in a form of audio, visual, data, storing the data to a memory device, sending the output through a connected or wireless system, printing the output or the like. The system may log information such as the measurement location, a corrective action, geographical location, time, date, number of measurement cycles, a unique lamp identifier, or the like. The alert or log may be automated, meaning the system may automatically output whether a correction was required or not. The system may also have associated alarms, limits, set points, or predetermined thresholds.

The various embodiments described herein thus represent a technical improvement to lamp control techniques. Using the techniques as described herein, an embodiment may use a method and device to control a lamp. This is in contrast to conventional methods with limitations mentioned above. Such techniques provide a better method to control a lamp and improve lamp efficiency.

Figure 10:
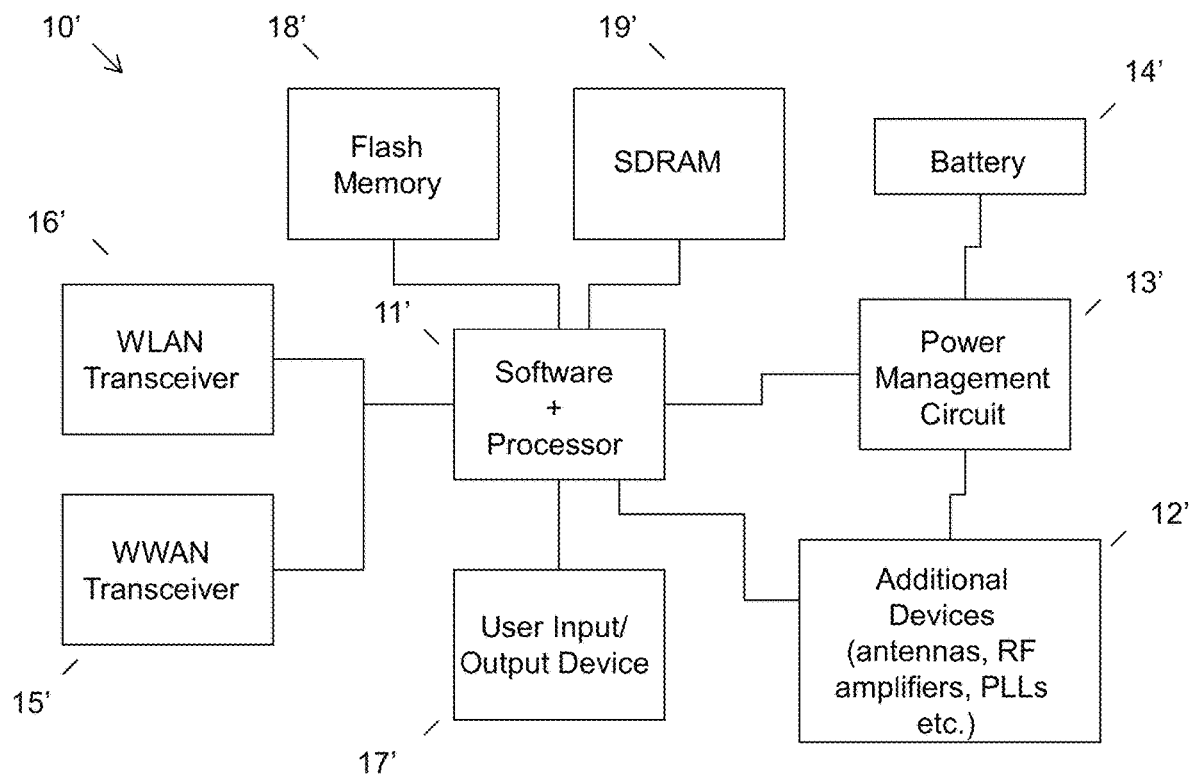
FIG. 10 illustrates an example of computer circuitry.

While various other circuits, circuitry or components may be utilized in information handling devices, with regard to an instrument for water treatment with a lamp according to any one of the various embodiments described herein, an example is illustrated in FIG. 10. Device circuitry 10' may include a measurement system on a chip design found, for example, a particular computing platform (e.g., mobile computing, desktop computing, etc.) Software and processor (s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to control a lamp.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A lamp apparatus, comprising:
   at least one filament;
   an amount of amalgam;
   a heat-sink assembly connected to the lamp apparatus;
   a data connection, wherein the data connection transmits and receives external device data; and
   at least one control circuit comprising a heating element and a temperature measurement element connected to the at least one filament, wherein the control circuit varies the electrical power delivered to the heating element, thereby controlling an internal temperature of the lamp apparatus relative to a temperature set point.

2. The apparatus of claim 1, wherein the lamp is an ultraviolet light source.

3. The apparatus of claim 1, wherein the lamp is a low pressure amalgam lamp.

4. The apparatus of claim 1, wherein the control circuit is in a parallel configuration with respect to the at least one lamp filament, and wherein the least one control circuit electrically communicates with the at least one filament in a 1:1 ratio.

5. The apparatus of claim 1, wherein the at least one filament comprises more than one filament, and wherein the control circuit is in a series configuration with respect to the more than one filament and electrically communicates with the more than one filament.

6. The apparatus of claim 1, wherein the at least one control circuit heats the amount of amalgam when the internal temperature is below the temperature set point.

7. The apparatus of claim 1, wherein the heat-sink assembly and the control circuit maintain a temperature of the amount of amalgam within a predetermined range with respect to the temperature set point.

8. The apparatus of claim 1, wherein the heat-sink assembly and the control circuit maintain the lamp output within a predetermined range.

9. The apparatus of claim 1, wherein the lamp apparatus does not comprise a passive system to compensate the internal temperature based upon at least one of: a fixed rate or an open-loop rate.

10. A method for controlling an internal temperature of a lamp:
    measuring a temperature of the lamp apparatus, wherein the lamp comprises at least one filament, an amount of amalgam, a heat-sink connected to the lamp, and at least one control circuit comprising a heating element and a temperature sensing element connected to the at least one filament;
    comparing the measured temperature of the lamp to a temperature set-point; and
    controlling, using the at least one control circuit and a data connection, the measured temperature of the lamp based upon the comparing, wherein the data connection transmits and receives external device data.

11. The method of claim 10, wherein the lamp is an ultraviolet light source.

12. The method of claim 10, wherein the lamp is a low pressure amalgam lamp.

13. The method of claim 10, wherein the control circuit is in a parallel configuration with respect to the at least one lamp filament, and wherein the least one control circuit electrically communicates with the at least one filament in a 1:1 ratio.

14. The method of claim 10, wherein the at least one filament comprises more than one filament, and wherein the control circuit is in a series configuration with respect to the more than one filament and electrically communicates with the more than one filament.

15. The method of claim 10, wherein the at least one control circuit heats the amount of amalgam in response to the measured temperature being below the temperature set point.

16. The method of claim 10, wherein the heat-sink assembly and the control circuit maintain a temperature of the amount of amalgam within a predetermined range with respect to the temperature set point.

17. The method of claim 10, wherein the heat-sink assembly and the control circuit maintain the lamp output within a predetermined range.

18. A product for controlling a lamp, comprising:
- a storage device that stores code, the code being executable by a processor and comprising:
- code that measures the internal temperature of the lamp, wherein the lamp comprises at least one filament comprising an amount of amalgam, a heat-sink connected to the at least one filament, and at least one control circuit comprising a temperature sensing element and a heating element, connected to the at least one filament;
- code that compares the measured temperature of the lamp to a temperature set-point; and
- code that controls, using at least one of: the heat-sink and the at least one control circuit, the internal temperature of the lamp based upon the comparing.

* * * * *